May 26, 1970     R. L. ELLER ET AL     3,513,625
INTERLEAFING SYSTEM FOR SHEET MATERIAL STACKING APPARATUS
Filed Aug. 16, 1967     10 Sheets-Sheet 4

FIG.2-B

INVENTORS:
RONALD L. ELLER
RONALD L. GOWLER
MILTON LIEF
BY
ATTORNEYS

May 26, 1970  R. L. ELLER ET AL  3,513,625
INTERLEAFING SYSTEM FOR SHEET MATERIAL STACKING APPARATUS
Filed Aug. 16, 1967  10 Sheets-Sheet 10

INVENTORS:
RONALD L. ELLER
RONALD L. GOWLER
MILTON LIEF
BY Gravely Lieder & Woodruff
ATTORNEYS

United States Patent Office 3,513,625
Patented May 26, 1970

3,513,625
INTERLEAFING SYSTEM FOR SHEET MATERIAL STACKING APPARATUS
Ronald L. Eller and Ronald L. Gowler, East St. Louis, Ill., and Milton Lief, Olivette, Mo., assignors, by mesne assignments, to L. W. Nash Company, East Palestine, Ohio, a corporation of Delaware
Filed Aug. 16, 1967, Ser. No. 661,124
Int. Cl. B65b *11/38;* B65h *39/14, 43/08*
U.S. Cl. 53—66
12 Claims

ABSTRACT OF THE DISCLOSURE

Sheet metal stacking apparatus which incorporates a system for automatically unrolling paper from a supply roll in response to the movement of sheet material to be stacked, measuring the paper length to that of the sheet material and cutting the proper length, bringing the cut paper and the sheet material together in a predetermined relationship, and maintaining the sheet material and cut paper in joined relationship until the sheet material has been stacked with the paper therebetween in interleafed order.

---

This invention relates particularly to improvements in apparatus for stacking sheet material with a protective layer or ply between the sheet material so as to result in the formation of a sheet stack interleafed with protective plies of material.

As the industry moves more and more toward automatic equipment and apparatus for handling sheet materials of all characters and description, it is natural that the producers of sheet material requiring refined surfaces are plagued with the objections from the users of this equipment that damage all too frequently occurs to the refined surfaces of the sheet material so that there is a growing rejection in certain areas of the sheet stacking industry where such drawbacks have not been solved. The problem then becomes one of providing automatically operating apparatus with means for interleafing or inserting protective sheet material between production sheets so as to afford protection for critically treated surfaces on these sheets (such as metal sheets that are required to have unblemished and unscratched surfaces, wood or plasterboard sheets that have a finished side and a rough side) where, in stacking, the finished and rough sides come together and the rough surface could mar or damage the finished surface. The presently available apparatus does not avoid the problems stated above, and, therefore, there is a high rate of rejected material and a monetary loss to the industry and to the purchaser.

Therefore, an important object of the present invention is to provide sheet material stacking apparatus with a novel and unique system for interleafing protective plies of material.

It is another important object of the present invention to provide apparatus of the above class which will automatically perform the interleafing operation in sheet stacking apparatus.

Still another important object of the present invention is to provide apparatus of the class above designated which will supply interleafing material into sheet stacking apparatus and perform this operation so that any changes in the length of the sheet material being stacked will be sensed by the interleafing system, whereby the stacked surfaces of the sheet material will be fully protected by an adequate length of interleafing material.

A further object of the present invention is to provide an interleafing system for sheet material stacking apparatus which will automatically measure out lengths of interleafing material to match the length of the sheet material to be stacked and to make sure that the interleafing ply of material will properly position itself and cling to the sheet material to be stacked throughout its movement from the time of bringing together the interleafing material and the sheet material until the composite sandwich reaches a state of rest in its final stacked position.

Other objects and advantages of the present invention will be disclosed hereinafter in connection with the description of a preferred embodiment which has been illustrated in the accompanying drawings, wherein:

Before making specific reference to the various figures in the accompanying drawings, a preferred embodiment of the present invention includes a suitable frame structure which supports a roll of paper from which the sections of interleafing material are to be cut, and provides, adjacent to the paper roll, a novel accumulator system which controls the unwinding speed of the paper roll and compensates for intermittent spacing of the sheet material which is to be stacked. There is means in association with the paper roll and its unwinding operation to limit the start-stop action of the unrolling of the paper and to make proper adjustments for preventing tearing or rupture of the web of paper as it unrolls, due to the jerks and strains because of the intermittent sheet feeding cycle. While paper is referred to hereinafter, it is understood that this term shall include any of the desired materials now available as a substitute for actual paper materials.

As the paper strip leaves the supply roll it is run through a feeding and chopping apparatus which is timed to the intermittent supply of sheet material, whereby the leading edge of each sheet of material to be stacked causes the start of the feeding action of the paper roll and the trailing edge causes the cessation of the operation of the feeding of the paper as well as the action of the cutting or chopping device so that a properly sized ply of protective paper is relayed into the system to join at the proper time with the sheet material to be stacked. Thereafter the protective ply remains joined with the sheet material through the remainder of the machine and until the final stacked position has been reached.

Each cut length of protective paper or ply of protective material is caused to meet with a sheet of material to be stacked such that the paper leads the forward edge of the sheet material so that it can be curled over the forward edge of the sheet for purpose of positively interlocking the protective ply and the sheet material. As the protective ply and the sheet material are projected into space in the stacking action of the apparatus, suitable means is provided to prevent the protective ply from becoming disengaged from the sheet material, even though the sheet material is to be floated on a cushion of air outwardly into space where it will then drop onto the final stack accumulating on a suitable pallet or other support.

It is, of course, recognized that an apparatus of this type can very easily create static electricity problems that cause paper material to stick to various objects and if this were allowed to occur the apparatus could very quickly shut down because of malfunction. Therefore, the preferred apparatus is equipped wtih a sufficient number of properly placed static eliminators or grounding devices so that there will be no malfunction from this cause.

Also, in the preferred apparatus, provision is made to prevent the interleafing protective ply from sticking or clinging to its transport means at unwanted areas such as the area or zone where the ply of protective material meets the sheet material, and such as in the zone where the sheet material to be stacked is projected into space and allowed to fall by gravity onto the stacking pallet. In such zone or station auxiliary means in the form of air jets, or the equivalent thereof is provided so that the protective paper ply will be positively prevented from clinging or sticking to anything but the sheet material surface which it is desired to protect.

The preferred apparatus also incorporates a drive system for the various rolls, belts and conveyors such that proper timing can be obtained to always maintain the protective ply of material under a small degree of tension so that it cannot crease, wrinkle, or in some way become deformed and lose its protective covering capability. As the proper timing of all of these rolls, belts, and conveyor means is predetermined, the apparatus may be powered by some variable speed source so that upon speed adjustments the overall linear feeding rate of the sheet materials, degree of tension in the protective sheet material, and coordination of all components will not be substantially altered from that which is desired.

Figure 1:
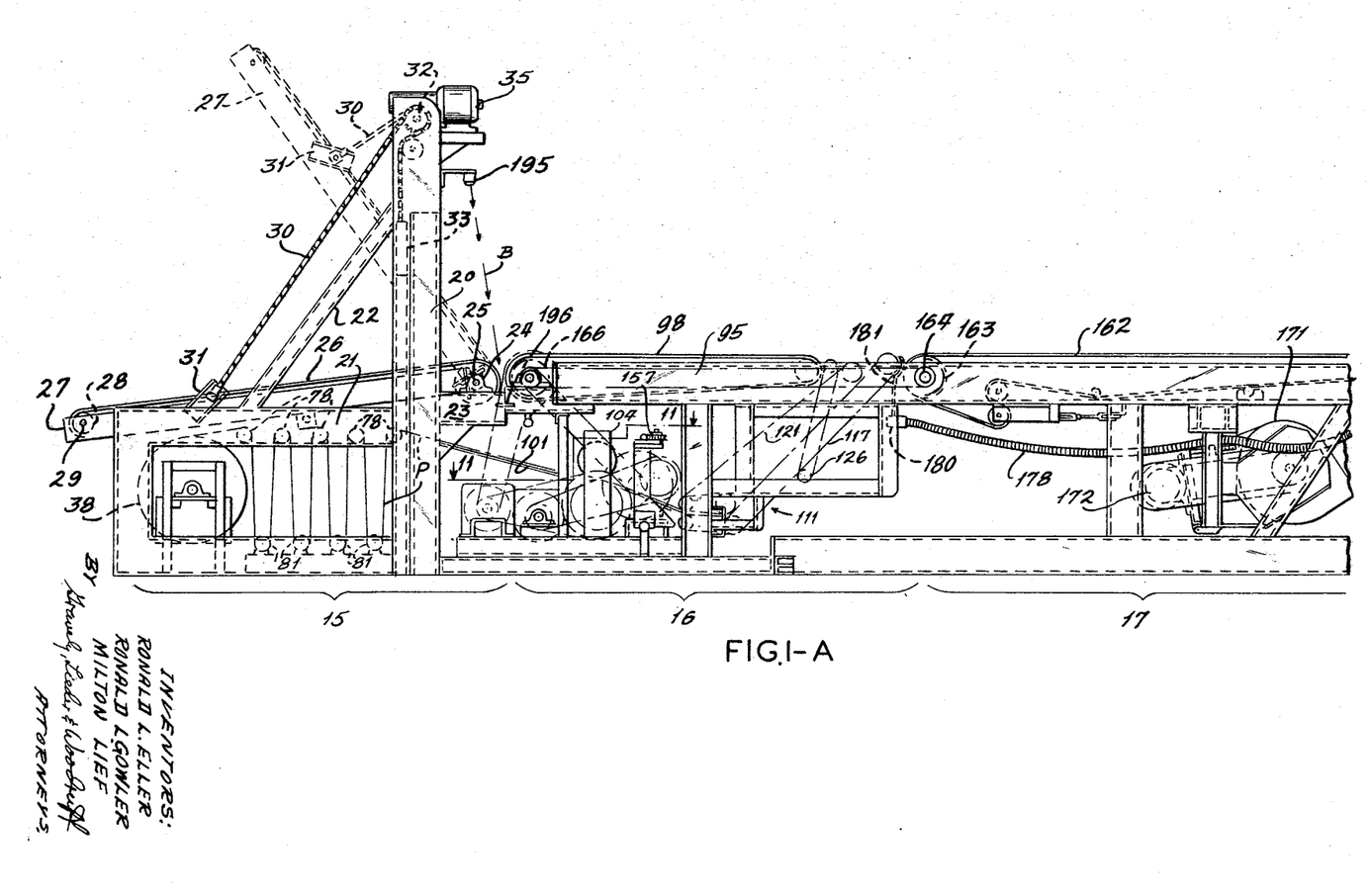
FIGS. 1A and 1B, together, represent a longitudinal side elevational view of the present apparatus incorporating the several characteristic features of this invention.

Turning now to FIGS. 1A and 1B the composite apparatus is made up of several sections arranged in series. Starting at the left in FIG. 1A and continuing to the right hand end of FIG. 1B the apparatus includes a section 15 for the protective paper supply and the receipt of the sheet material to be interleafed, a section 16 for sizing and cutting the protective paper in accordance with the length of sheet material, a section 17 (this section carries over to the left hand end of the view in FIG. 1B) for mating the sheets of material with the cut paper ply, and finally a section 18 where the sheet material with the interleaf ply is stacked for subsequent handling. A suitable frame structure is provided for the several sections and this structure will hereinafter be described only to the extent that is believed necessary for a full understanding of the present improvements and novel aspects of the invention.

Section 15 of the apparatus is best seen in FIGS. 1A, 2A, 4A, 7 and 8. Looking now at these several views it can be seen that a pair of vertically elongated columns 20 are placed at each side of the apparatus. Side frames 21 are connected to each column 20 and diagonal braces 22 extend between the columns and side frames. Each column 20 is provided with a bracket 23 (FIG. 1A) to carry the bearings 24 for a cross shaft 25 which carries a group of conveyor belts 26 (FIG. 2A) running on suitable pulleys in a pivot frame 27 which moves about the bearing axis as shown in broken outline in FIG. 1A. The belt 26 runs over individual idler pulleys 28 on shaft 29 at the run-on end of the belt conveyor for the sheet material to be stacked. The belt conveyor frame 27 is moved between its operating (down) position and its raised pivoted position by chains 30 connected at brackets 31 on each side of the frame 27. These chains run over driven sprockets 32 mounted near the top ends of the columns 20 and the ends are connected to counterweights 33 (FIG. 1A) moving adjacent the columns 20. The sprockets 32 are interconnected by a cross shaft 34 (FIG. 2A) and reversible motor means 35 is drivingly connected to the cross shaft 34 through a suitable gear box 36.

The protective paper ply P is taken from a supply roll 38 (see FIGS. 1A, 2A, 7 and 8) mounted on center plug supports 39 and 40. The plug support 39 is mounted in a bearing 41 carried in an adjustable traversing stand 42 mounted by rollers 43 in a track assembly 44. The stand 42 carries a motor 45 connected to a gear unit 46 from which the sprocket 47 extends for driving connection by chain 48 to sprocket 49 on the shaft portion of the center plug 39. The speed of the motor 45 is controllable through a suitable silicone control rectifier (SCR) unit 51 (FIG. 7) which is under the direction of a multi-station rotary limit switch unit 52 to be described presently. The opposite center plug support 40 (FIG. 8) is mounted by a suitable bearing 53 in an adjustable traversing stand 54 mounted by rollers 55 in the track assembly 44 for the cooperating adjustable stand 42. Stand 42 carries an air cylinder 56 which actuates a brake pad 57 that engages the end face of the paper roll 38, and stand 54 also carries a similar air cylinder 58 that actuates a brake pad 59 for engaging the adjacent end face of the paper roll 38. These air cylinders 56 and 58 are under the control of the rotary limit switch unit 52 as will be explained presently.

The stand 42 can be adjusted along track assembly 44 to the phantom position (FIG. 8) by a nut 60 running along a stationary screw shaft 61 driven through a pair of gears 62 and 63, gear 63 being on the left hand end of a drive shaft 64. The right hand end of shaft 64 is provided with a sprocket 65 connected by chain 66 to a sprocket 67' on shaft 67 of hand wheel 63. A brake 69 locks the hand wheel 68 in adjusted position. Similarly, the adjustable stand 54 can be adjusted along track 44 to the phantom position by a nut 70 running along stationary screw shaft 71 driven by sprocket 72 connected by chain 73 to a sprocket 74' on shaft 74 of another hand wheel 75. Brake 76 locks the wheel 75 in adjusted position.

Figure 4:
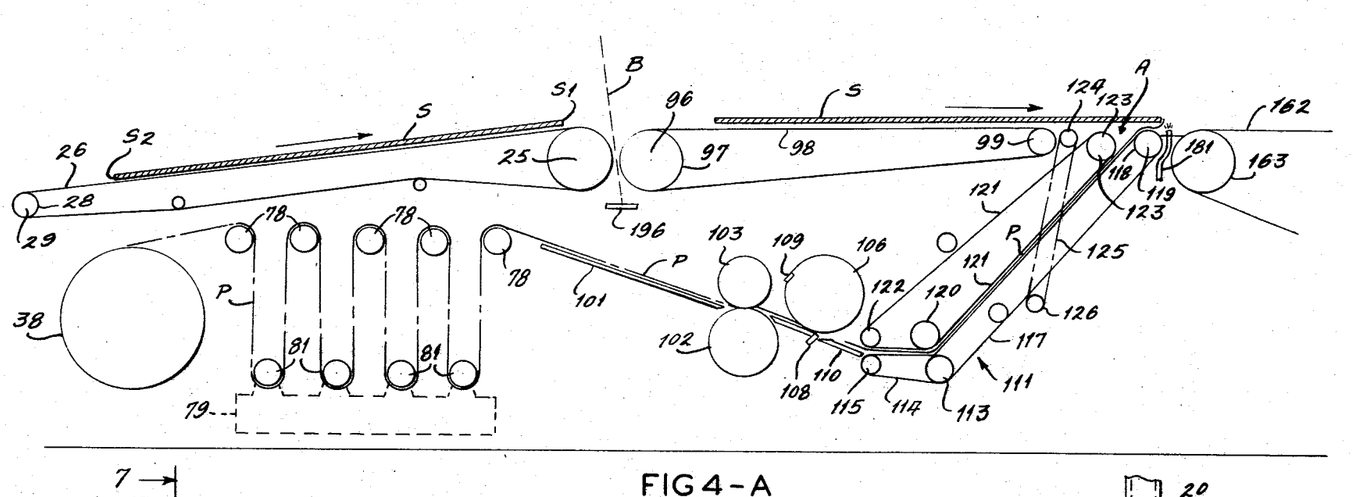
FIGS. 4A and 4B are fragmentary schematic elevational views of the various portions of the interleafing system incorporated in the stacking apparatus shown in FIGS. 1A and 1B.
Figures 4, 6:
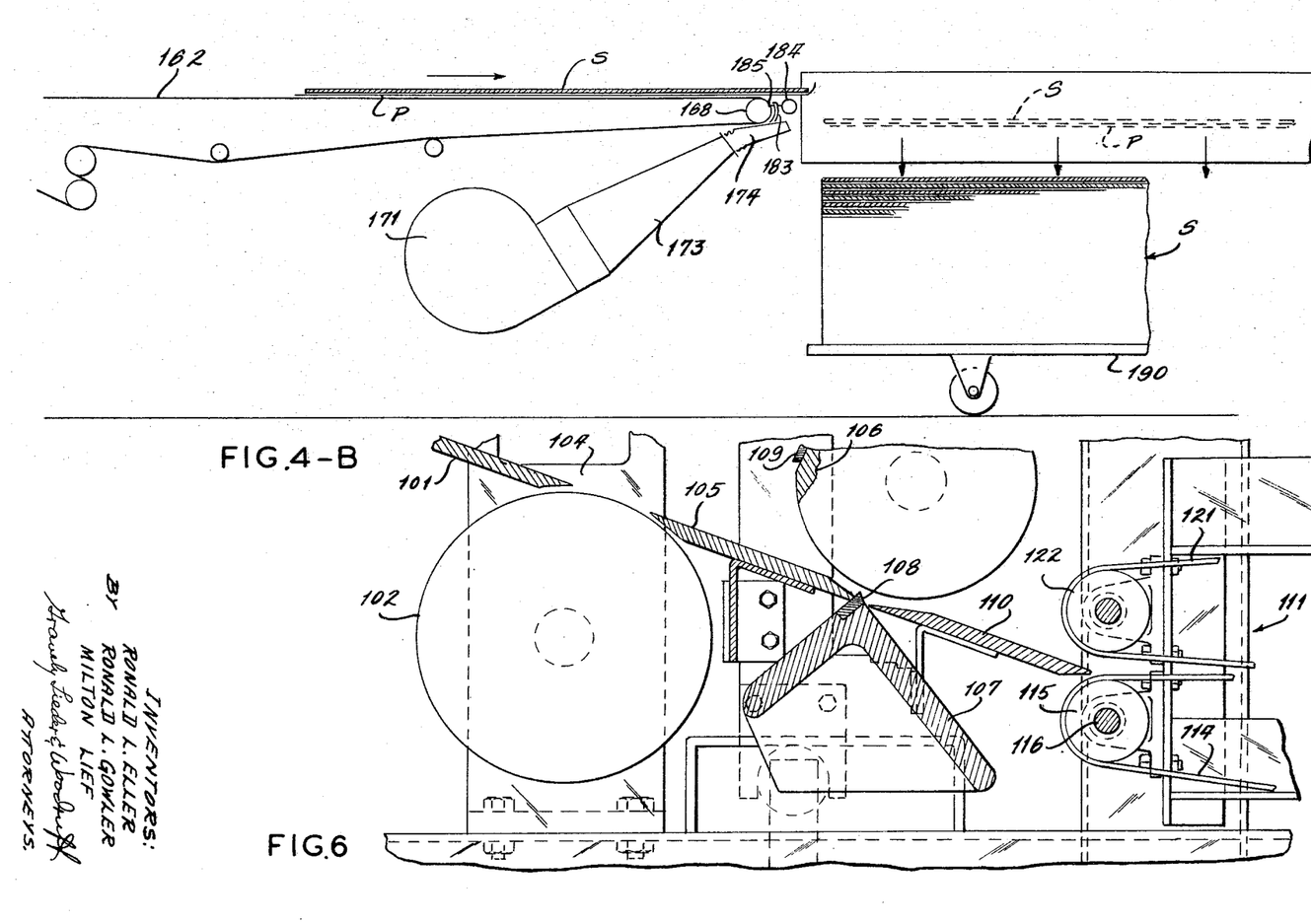
FIG. 6 is a greatly enlarged and fragmentary sectional view of the cutting means employed in the present apparatus.
Figure 7:
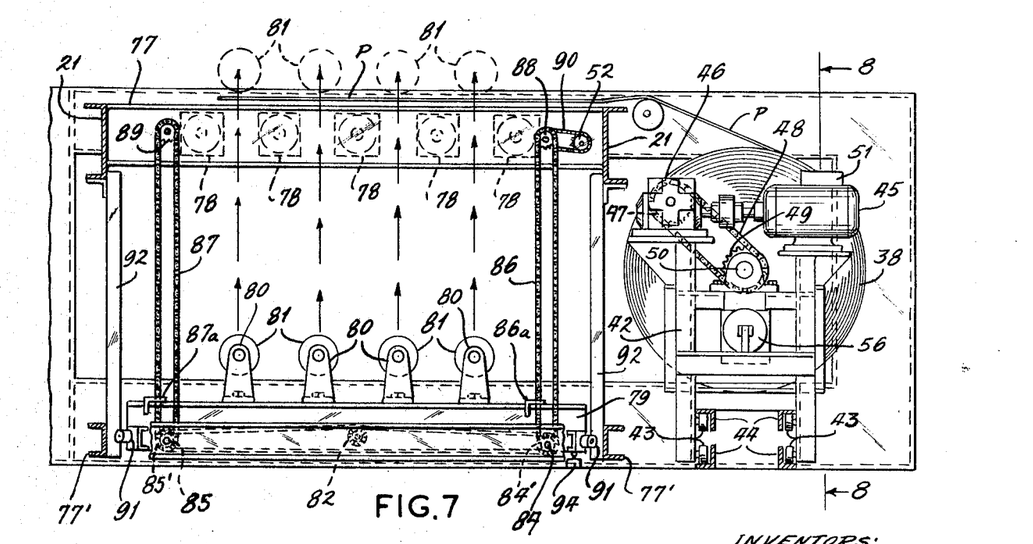
FIG. 7 is a side elevational view, partly in section of the apparatus shown at the left hand end of FIG. 1A, but from the opposite side.
Figure 8:
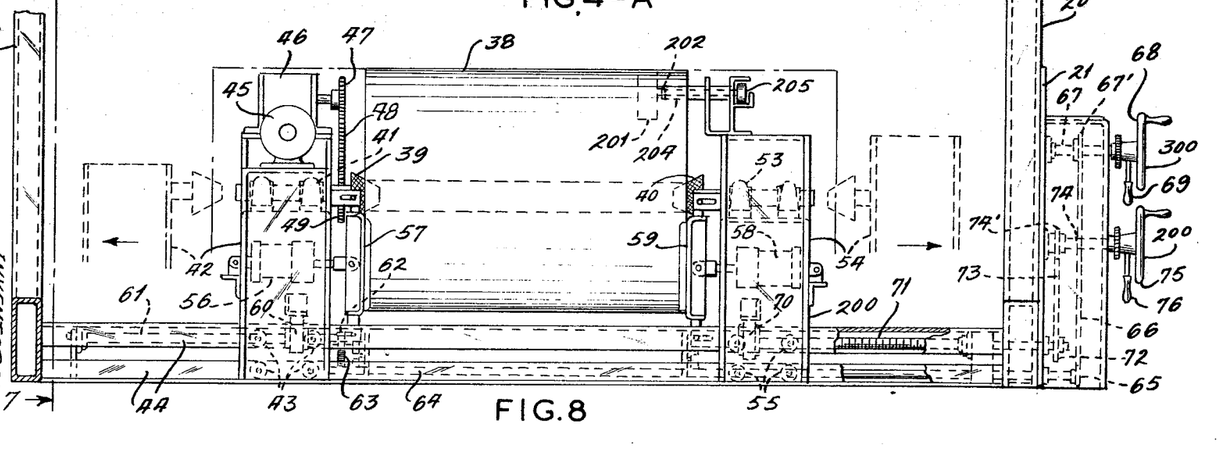
FIG. 8 is a transverse, partly sectional and fragmentary view taken at line 8—8 in FIG. 7.

The paper P from roll 38 is threaded through an accumulator assembly mounted in a fixed frame consisting of head members 77 (only one being shown), vertical tracks 92 and lower members 77'. The head 77 supports plurality of rolls 78 arranged in spaced relation, while a lower movable frame 79 carries a plurality of stands 80 to support rolls 81. The frame 79 may be elevated to the place where the rolls 81 pass between and above rolls 78 (phantom outline in FIG. 7) so the paper P can initially be passed between the rolls. The motion of the lower frame 79 is maintained level as the exiting paper lifts the lower frame 79 by a system of cross shafts 84 and 85 mounted in members 77' to coordinate the action of chain 83 engaged with sprockets 84' and 85' and an idler sprocket 82. Vertical sprocket chains 86 and 87 respectively run over lower sprockets (not shown) on shafts 84 and 85, and the upper ends engage upper sprockets 88 and 89 in the fixed frame 77. These chains 88 and 89 are attached by anchors 86a and 87a to the movable frame 79. The upper right sprocket 88 is a double sprocket so it can drive a sprocket chain 90 for actuating the multi-station switch 52, thus making this switch responsive to the raising and lowering movement of the frame 79. Frame 79 is steadied during movement by guide rolls 91 engaged on tracks 92. While the view in the drawings, as above described shows only one end, it is understood that the opposite end of the accumulator assembly is similarly equipped with chains and sprockets so that cross shafts 84 and 85 operate pairs of chains 86 and 87 that raise and lower the frame 79 and maintain it level in both longitudinal and transverse directions. A drive (not shown) for shaft 88 in the fixed frame 77 allows the movable frame 79 to be manually raised for the paper, and after threading the paper P straight between rolls 78 and 81, the frame 79 is lowered to draw the paper into a plurality of loops (FIGS. 1A and 4A). The last fixed roll 78 (at the left of FIG. 7) guides the paper P out o the supply section 15 and into the section 16. This accumulator assembly operates to control the unwinding speed of the paper P and compensates for intermittent spacing of the sheet during the start-stop operation of the roll 38. As the lower frame 79 rises during operation of the apparatus, it actuates the rotary switch 52 through chain 90, and the switch 52 (the electric wiring has not been shown for convenience) controls the silicone control rectifier (SCR) until 51 at motor 45 to regulate the speed of the motor and hence the speed of the paper roll 38. Thus as the frame 79 rises the motor 45 undergoes an increase in speed to feed the paper P faster. This is advantageous for light weight paper as it smoothes out the jerks caused by the start-stop operation of the brake pads 57 and 59.

The paper roll drive system thus described matches the line speed as required but it also overcomes the inertia of the paper roll 38 to prevent the possibility of paper tearing due to the snap or jerk induced by the paper being exited to the accumulator means. For heavier grades of paper the motor 45 may be disconnected as the heavier paper is usually sufficiently strong to overcome the roll inertia. Also, the lower frame 79 serves to stop the paper roll unwind action of motor 45 when the electric system 52 and 51 is connected by, in its lowest position actuating a limit switch 94 (FIG. 7) to stop the motor 45 and to apply the brakes 57 and 59 through the air cylinders 56 and 58 respectively.

Section 16 of the apparatus (FIGS. 1A, 2A, 3A, 4A and 9) includes a suitable frame assembly 95 which supports a cross shaft 96 on which pulleys 97 are fixed to carry a plurality of conveyor belts 98. The belts 98 run over idler pulleys 99 carried on shaft 100. These belts 98 support the sheet material S (FIG. 4A). Below the belts 98 there is arranged the paper feed and cutting means now to be described.

Looking at FIGS. 1A, 3A, 6, 9, 10 and 11, the paper P is fed over a dead plate 101 and enters between a nip roll 102 and a rubber coated idler roll 103, the rubber covering (FIGS. 10 and 11) being formed with a herringbore pattern to maintain the paper P slightly stretched from side to side to prevent puckering. The nip roll 102 and the idler roll 103 are suitably carried in end stands 104. From the nip roll 102 the paper P moves over a second dead plate 105 toward rotary fly cutter roll 106 which cooperates with a fixed blade frame 107 (FIG. 6) in which a full width cutter blade 108 is carried in position to meet the full width fly blade 109 in roll 106 (FIG. 4A). The dead plate 105 is suitably aligned with a third dead plate 110 beyond the cutter blade 108 to carry the paper P into a carrier belt means 111 which traps the paper and carries the paper sheet upwardly to mate with the sheet material S moved by conveyor belts 98.

The paper carrier belt means 111 includes a main cross shaft 112 carrying a pulley 113 over which strip belts 114 are trained. The strip belts 114 run over idler pulley 115 supported on a cross shaft 116. A second set of strip belts 117 extends from pulley 113 in an upward inclined direction to pulley 118 on idler shaft 119 supported substantially at the elevation of the conveyor belts 98 for the sheet material S. Substantially directly above the pulley 113 is a pulley 120 which is driven by frictional contact with pulley 113. The pulley 120 carries a second set of strip belts 121 which are trained over lead in pulley 122 located above and slightly spaced (FIG. 6) above idler pulley 115. The strip belts 121 have a working run parallel with strip belts 117 and closely adjacent thereto throughout to an elevated idler pulley 123 carried at the elevation of conveyor belts 98. Thus, the cut sheet of paper P is carried between the adjacent strip belts 117 and 121 upwardly to the exit zone A. Since idler pulley 123 is spaced (FIG. 3A) from the idler pulley 99 of the conveyor belts 98, a filler roll 124 is placed in this space and is driven by a chain 125 from a cross-roller 126 in frictional drive relation with the returning pass of strip belts 117. The roll 124 carries the sheet S over this gap and onto the idler pulleys 123 where it meets the paper P.

Figure 2:
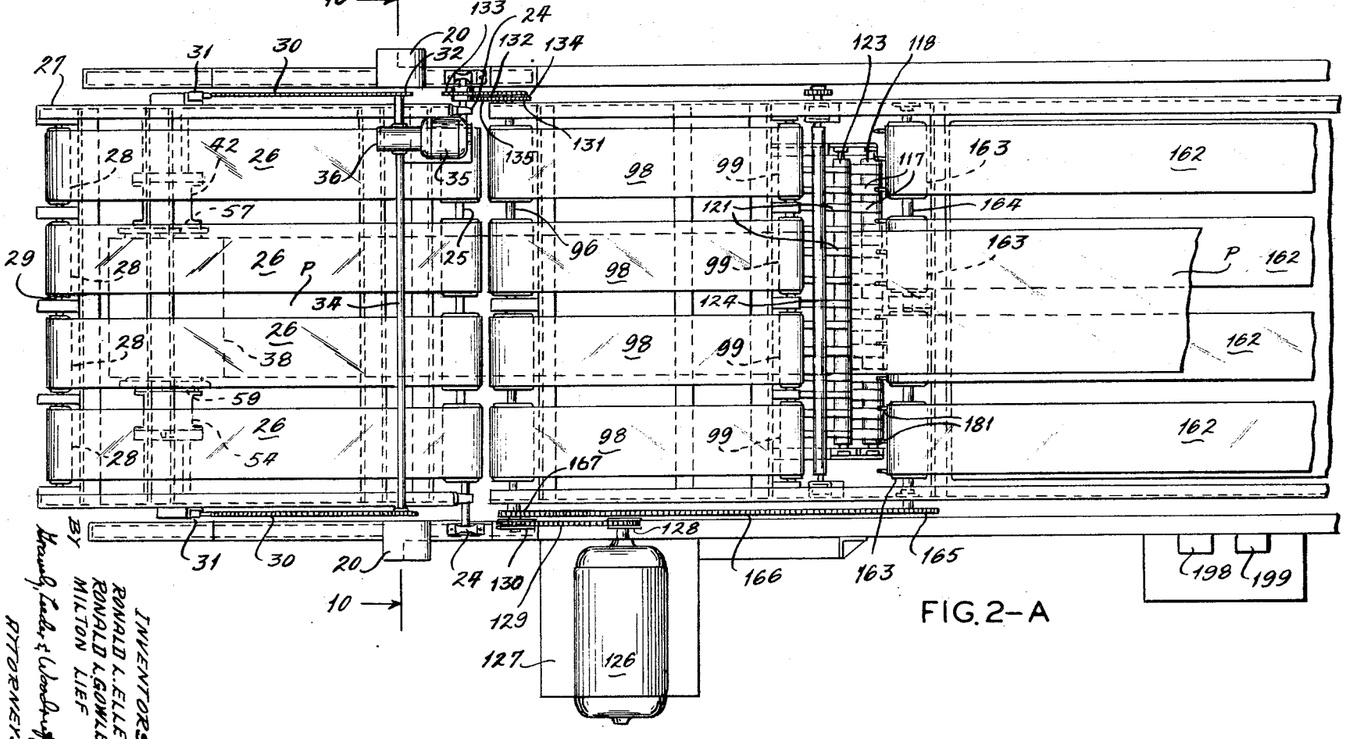
FIGS. 2A and 2B, together represent fragmentary plan views of the apparatus shown in FIGS. 1A and 1B.
Figure 3:
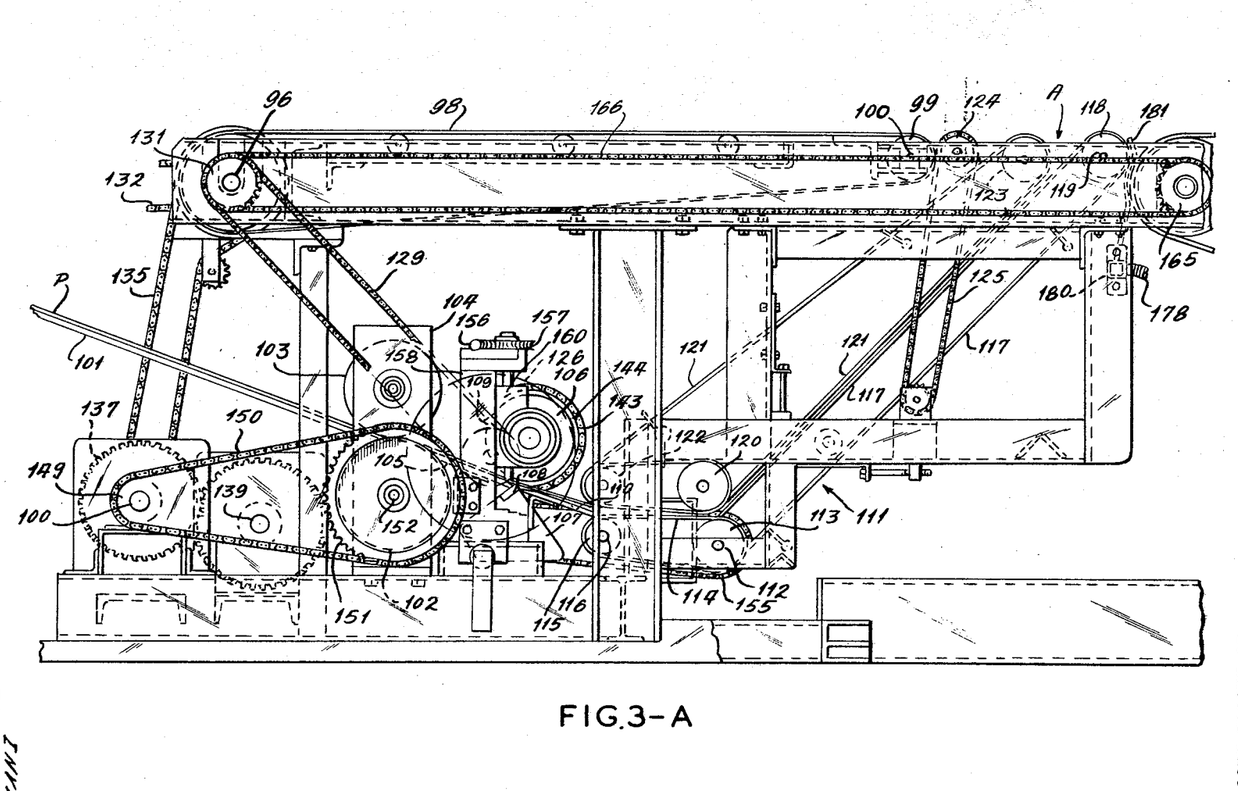
FIGS. 3A and 3B represent fragmentary side views of those portions of the apparatus shown in 2A and 2B, respectively.
Figure 9:
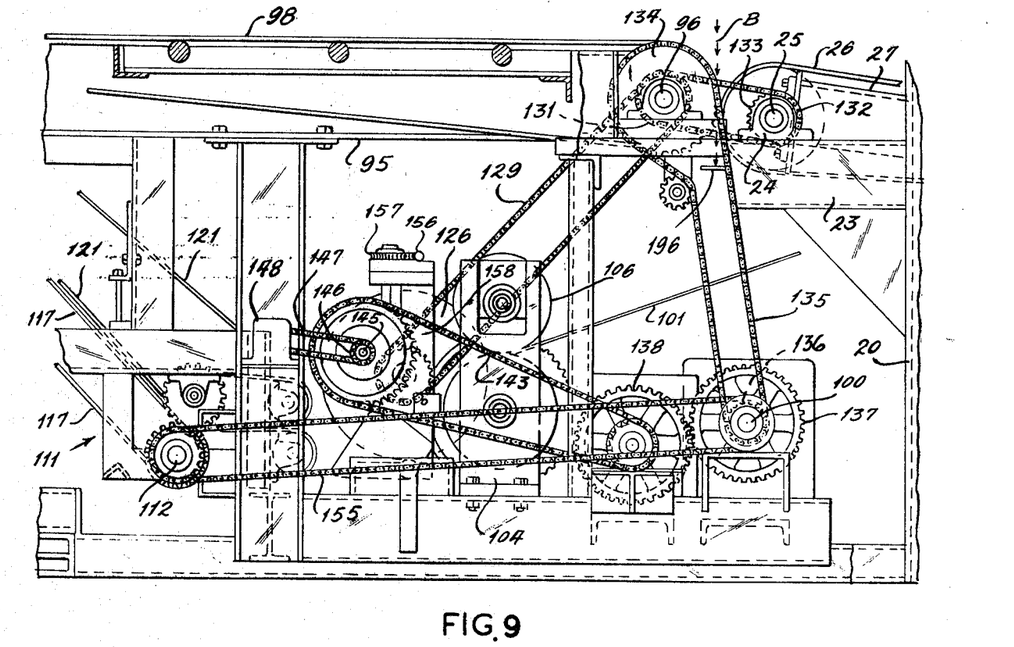
FIG. 9 is a view similar to FIG. 3A but taken from the opposite side of the apparatus.
Figures 10, 11:
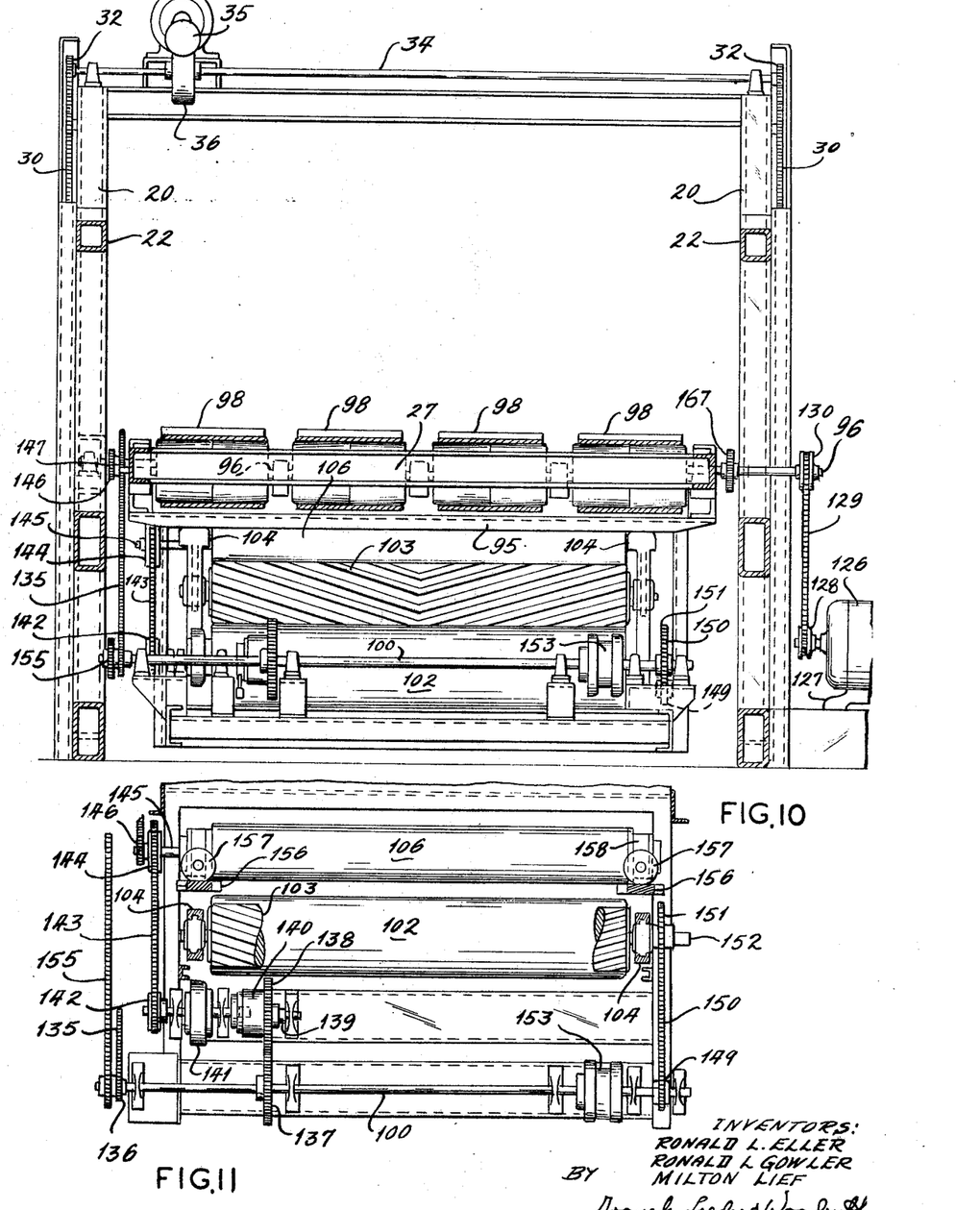
FIG. 10 is a transverse sectional elevational view taken along line 10—10 in FIG. 2A.
FIG. 11 is a detailed view taken along line 11—11 in FIG. 1A.

As can be seen in FIGS. 2A, 3A, 9, 10 and 11, a variable speed main drive motor 126 carried on a suitable base 127 has its drive sprocket 128 connected by chain 129 to a sprocket 130 on the shaft 96 (FIG. 2A). From driven shaft 96 a sprocket 131 at the opposite end from sprocket 130 drives a chain 132 (FIG. 9) connected to sprocket 133 on shaft 25 for driving the conveyor belts 26 in section 15. Also a sprocket 134 fixed on shaft 96 drives chain 135 connected to a lower sprocket 136 fast on shaft 100 (FIG. 3A). The power delivered to shaft 100 by chain 135 is used to drive a pair of gears 137 and 138. Gear 138 is mounted on a one-revolution clutch device 140 which drives shaft 139 (FIG. 11). An adjacent brake means 141 on shaft 139 is used to stop shaft 139 and through sprocket 142 driving a chain 143 connected to sprocket 144 on the end of the shaft 145 for the fly-cutter roll 106. The shaft 145 also is provided with a sprocket 146 which drives chain 147 (FIG. 9) that actuates a rotary cam controller 148. Shaft 100 (FIG. 3A) is provided with a second sprocket 149 (FIGS. 3A and 11) driving chain 150 connected to the sprocket 151 fast on the shaft 152 for the nip roll 102. Interposed on shaft 100 adjacent sprocket 149 (FIGS. 10 and 11) is a clutch-brake unit 153 which controls the sequence of paper feed. This unit 153 is subject to control from the cam control unit 148 (the wiring has been omitted for clarity).

As can be seen in FIGS. 3A and 9 power from shaft 100 is delivered by sprocket chain 155 to the shaft 112 for driving the tape belts 117 of the paper feed system 111. There is thus provided a coordinated drive system for the several components of the apparatus, all driven from the variable speed motor 126, and all positively responsive thereto and to each other so that speed ratios can be maintained.

Adjustment for the fly cutter 106 (seen in FIGS. 3A, 9 and 11) is obtained by a worm 156 and worm gear 157 unit suitably mounted on top of the stand 158. The worm gear 157 is fast on a screw shaft 159 connected to the bearing block 160 that supports the cutter shaft 145. There are a pair of worms 156 so that the fly cutter roll 106 can be vertically adjusted by sliding the blocks 160 on the stands 158 to obtain the desired mating of the fly cutter blade 109 and the fixed blade 108 (FIG. 4A).

The section 17 of the present apparatus also has a suitable frame which may be a continuation of the frame structure for section 16. There is arranged in section 17 (FIGS. 1A, 1B, 2A, 2B, 3A and 3B) an overhead group of conveyor belts 162 driven from pulleys 163 on a common shaft 164. Shaft 164 is extended (FIG. 2A) to carry a sprocket 165 for the drive chain 166. The opposite end of chain 166 is engaged on sprocket 167 fast to shaft 96. The opposite ends of the belts 162 are supported by pulleys 168 on a cross shaft 169 mounted adjacent the pair of vertical columns 170 at the feed-in end of the stacker section 18. The section 17 also includes a main blower unit 171 driven by motor means 172. The blower outlet is an expanded duct 173 connected to the outlet nozzle 174. The nozzle 174 is provided with an adjustable lip 175 so the direction of the air blast or flow from the nozzle 174 may be varied as desired. Next to blower 171 is a second blower 176 driven by motor means 177 to deliver air through two flexible ducts 178 and 179 (FIGS.

2B and 3B). The duct 178 extends to a manifold 180 (FIGS. 1A, 2A and 3A) where a plurality of blast tubes 181 extend upwardly and terminate adjacent the roll 118 for the strip belts 117. The other duct 179 extends to a manifold 182 from which extend a plurality of conduits 183. The conduits 183 are supported between the idler pulleys 168 and a gap filling roller 184 in a flat plate 185. The plate 185 forms the floor for a longitudinal trough between pulleys 168 and the filler roll 184 so that the air delivered by the conduits 183 will more uniformly distribute crosswise of the sheets S passing over the top and cause the protective paper plies to resist breaking away from the underside of the sheets S as the sheets S and interleafed plies P start into the space in the stacking section with the assistance of a stream of air issuing from the nozzle 174. There is a critical stage in this zone of the apparatus where the air flow from the nozzle 174 has the tendency to ripple the paper ply and cause it to break away, but the jets of air from conduits 183 give the leading margin of the paper ply a boost to cling to the leading edge of the sheet material.

The final section 18 of the apparatus is fairly conventional and need not be described in great detail. The general frame 187 is supported by tension rods 188 (FIGS. 1B and 2B). Side guides 189 are operably mounted in the frame 187 so that the sheets S will stack in desired alignment on a pallet or cart 190. The stack of sheets S grows in height and to accommodate this, the frame for section 17 of the apparatus is adapted to pivot about shaft 164 as an axis so that the opposite discharge end between the columns 170 can move vertically a desired amount. Motor means 191 drives a vertical screw shaft 192 in each column 170 to engage in a threaded element fixed to the frame of section 17. The drive is by a gear unit 193 and a cross shaft 194 (FIG. 2B).

Reference will now be made to FIGS. 1A, 4A, 4B and 5 where there is shown schematically and in some detail tde present apparatus which will serve as the basis for the following description of operation thereof. In FIG. 1A there is shown, supported by the column 20 at an elevated point, a source of light 195 and a photosensitive element adjacent thereto. At a suitable place below the light source 195 and between the conveyor belts 26 and 98 there is disposed a reflector 196. The electrical wiring is again not shown, for clarity, but it is understood that the photoresponsive unit at the light source 195 is connected into the wiring circuit including the cam controller unit 148 (FIG. 9).

Therefore, as the light beam B (FIG. 4A) is broken by the leading edge S–1 of each sheet of material S, an electrical signal will be created which will actuate the combined clutch-brake coupling unit 153 to release the brake and engage the clutch so that power transmitted to the shaft 100 will be transmitted to rotate the nip roll 102 and its rubber covered cooperating roll 103. The actuation of these rolls draws the paper P from the accumulator apparatus of FIG. 7 and feeds it into the paper feeding conveyor system 111. The feed of the paper P will continue and the leading edge of the paper will be moved up the inclined path formed by the cooperating plurality of strip belts 117 and 121 toward the gap A. The sheet material S will be moved by the conveyor belts 98 and 26 also toward the gap A. When the trailing edge S–2 of each sheet S allows the light beam B to be restored another signal will be generated from the photocell, and this signal will be transmitted (by electrical wiring not shown for clarity) to the single revolution clutch unit 140 and at the same time to the brake 141. The first signal releases the brake 141 and actuates an air cylinder for the unit 140 which operates the usual trip pin in such unit. The trip pin causes the clutch to engage and as one complete revolution is completed the trip pin is again actuated to release the clutch so that the cutter roll 106 is given one complete revolution from its starting position shown in FIG. 4A and then the brake 141 is applied. A suitable time delay release (not shown) permits the nip roll 102 and its companion roll 103 to continue feeding the paper P so that the leading edge of the paper after the cut has been made by the cutter 108 and 109, will continue into and be gripped between the strip belt system of feed means 111. It is now understood that the light beam B is utilized to sense the arrival and passage of each sheet of material S and that the rotary cutter 106 is not actuated until the trailing edge S–2 of each sheet again re-establishes the light beam. Thus, the means shown in FIG. 4A will automatically operate to measure out a sheet of paper P somewhat longer in length than the sheet of material with which it is to be mated. It is also evident that variations in the length of a series of sheets S will automatically be mated with a properly selected length of protective paper P.

Figures 1, 5:
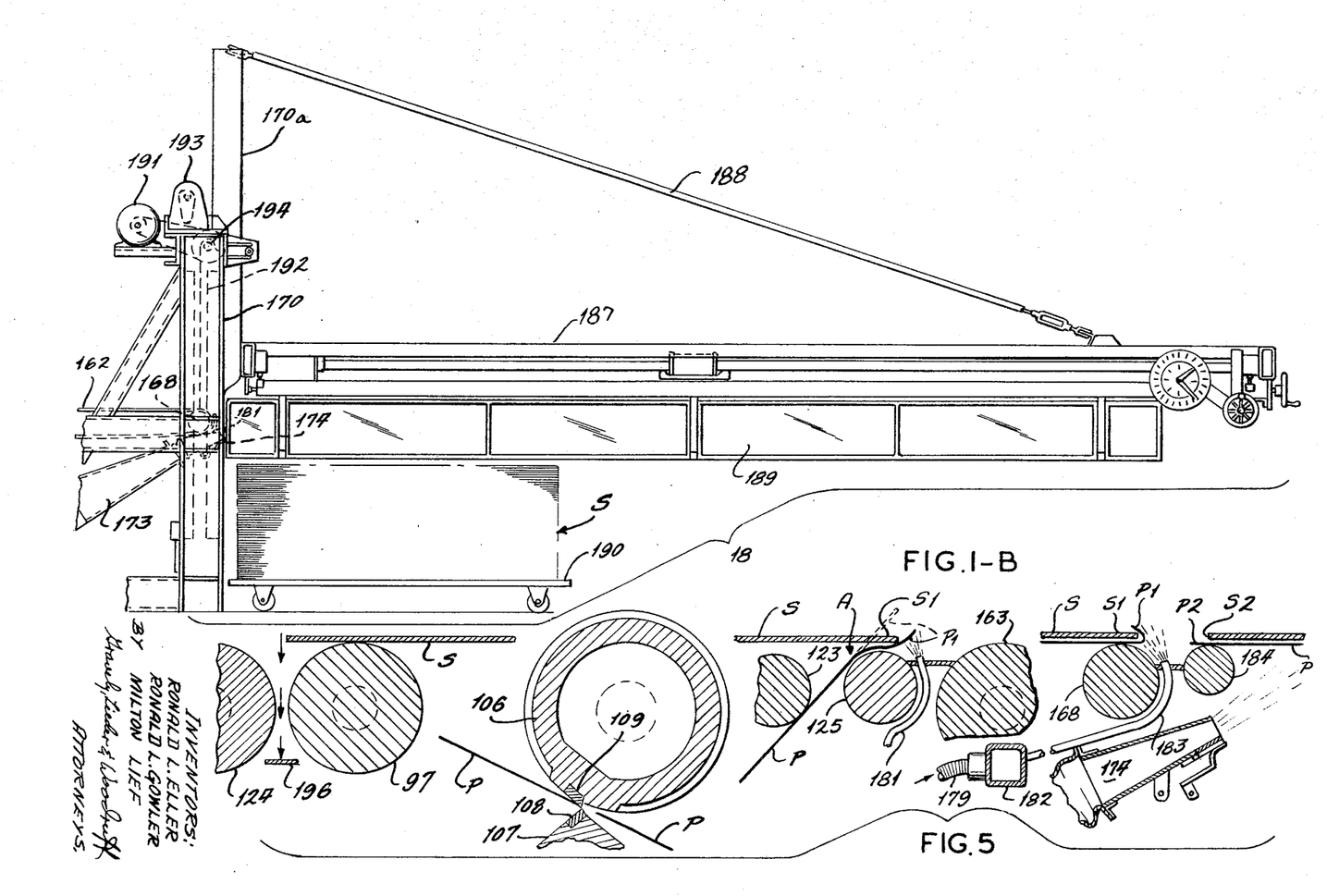
FIG. 5 is a diagrammatic view of the system for automatically cutting the interleafing material and for causing it to remain prepositioned relative to the sheet material on its way to final stacked position.

Looking now at FIGS. 4A and 5, it can be understood that the cut piece of protective paper P has its leading edge projection into the gap space A with the leading portion thereof P–1 projected toward the plane of movement of the leading edge S–1 of the sheet material S. The leading edge S–1 may lag, match or even lead the leading portion P–1 of the paper. In a lag condition the sheet and paper assume the positions shown in FIG. 5. In this particular cycle in the meeting of the sheet S with its interleafing ply P, a series of air blasts is projected against the paper through the conduits 181. The air supply prevents the leading portion of the paper P–1 from sticking to the roll 125 which it might do because of the pick up of a static charge of electricity. Thus, the leading portion P–1 of the paper ply will be caught by the leading edge S–1 of the sheet material, but the air blast will also cause the paper to cling as the two plies go onto the conveyor 162 of the section 17 of the present apparatus. In many cases it is advantageous to have a portion of the paper P–1 project in front of the leading edge S–1 of the sheet material in order to take care of a tendency for the sheet material to slide or creep forward on the paper ply during the time it is moving on the conveyor belts 162, but some conditions dictate that there be no projecting paper ply.

It has been indicated above that suitable timing means of known character can be incorporated in the present apparatus to allow the protective ply cutter 106 to delay its cutting cycle for a time sufficient to pass more or less of a length of the paper ply to be laminated with the sheet material S. A control system has been diagrammatically shown in FIG. 12 and reference will be made thereto. In the control system the photocell 195 and reflective member 196 are referred to as the sensor. The function of the sensor is to detect the flow of sheet material S and it is located in advance of the place where the cut sheets are matched with the protective paper plies. The sensor is actuated and therefore detects the entry or leading end S–1 of an incoming sheet of material, and it remains activated so long as the sheet material interrupts the light beam B (FIG. 1A). The sheet of material being detected by the sensor results in actuation of the transistorized timer 198 which has precision or close tolerance but can be adjusted to give a desired signal to the clutch and brake means 153 interposed in the drive shaft 100 for operating the paper ply feeding roll 103. Upon receipt of such a signal the clutch brake means 153 causes the paper roll 102 to be driven which feeds the paper off of the supply roll 138 and through the accumulator assembly where the paper passes the cutting roll 106 and heads into the feed belts 114 and 121 (FIG. 3A). The feeding of the paper ply P will continue until the clutch and brake 153 receives a signal from the rotary cam switches 148 (FIG. 9), which cam switches are driven by a suitable chain 147 from the rotary cutter 106. The tail end S–2 of sheet passes the position of the light beam B (FIG. 1A) and restores the light beam so that the sensor cuts off the signal to the timer 198. The timer 198 thereupon becomes de-energized and in so doing sends a signal to the timer 199. The timer 199 is also a precision or close tolerance device which has settings that determine the delay in the transmission of the signal to the actuator 200 for the one-revolution clutch unit 140. The timer 199, therefore, controls the length or amount of paper which is fed past the cutter element 108 before the cutter 106 is given a signal to cut the paper. Variations in the time of delay will, of course, determine whether the cut length of the protective ply will be shorter than, as long as, or longer than the sheet material S.

Figures 3, 12:
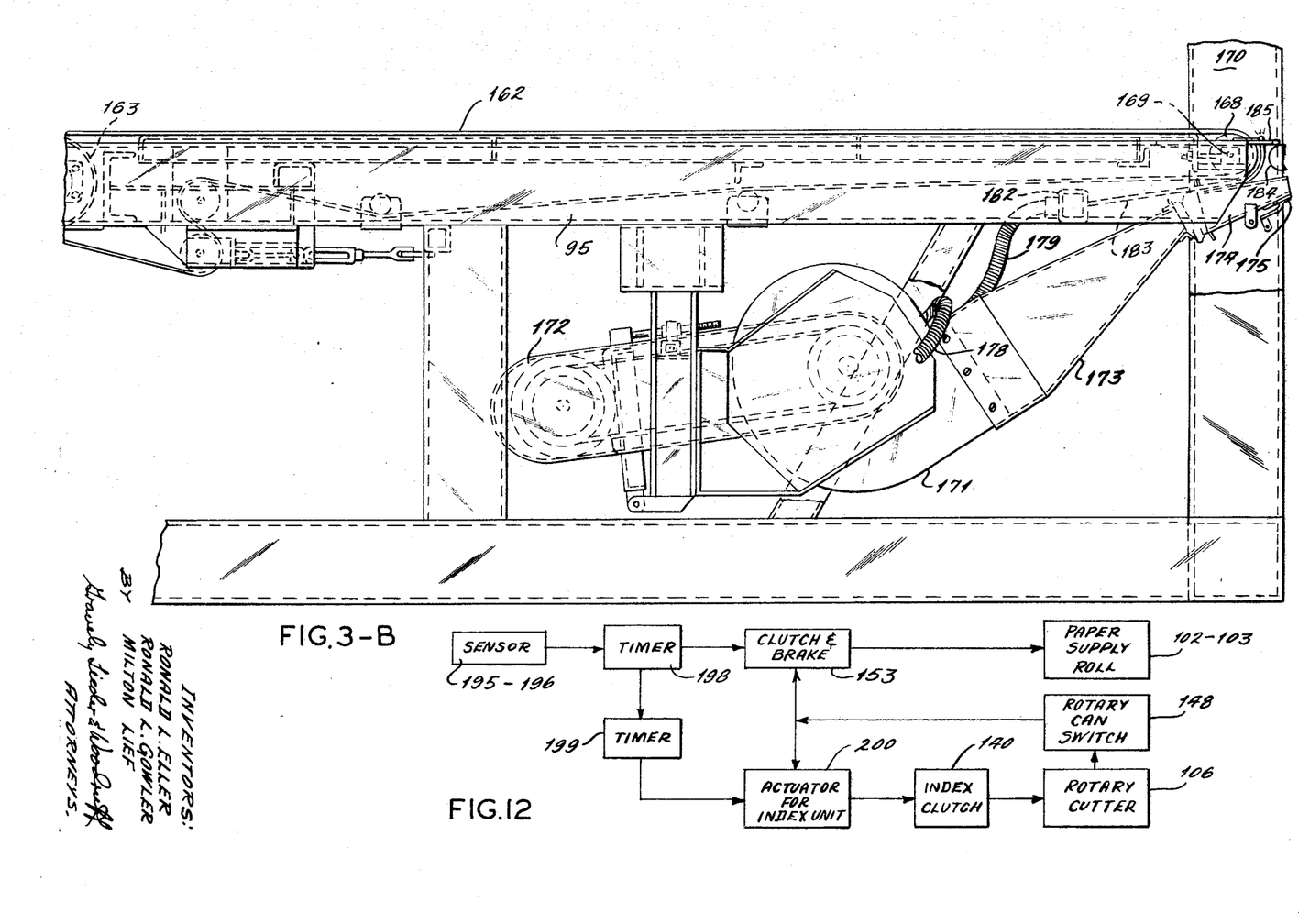
FIG. 12 is a block diagram of the control system.

Upon receiving a signal the actuator 200 causes the clutch 140 to engage so that a rotary cutter 106 will go through its one revolution action. The rotation of the cutter 106 drives the rotary cam switch group 148, and switches (not shown) therein are adjusted so that upon the rotary cutter reaching a desired degree of rotary displacement a signal will be sent to the clutch and brake means 153 and a signal will also be sent to the actuator 200. These signals cause the means 153 to stop the feeding of the paper by roll 102 and the rotation of the cutter 106 so that only a single cut is made during the time the light beam B is broken and then restored. The stopping of the feeding of the paper P preferably takes place when the leading edge thereof, following the action of the cutter means 108 and 109, will have moved partly into the paper feed belts 114 and 121.

It will appear from the above that the control system follows an automatic cycle initiated and ended by the sensor consisting of the photocell 195 and the reflector 196. While not specifically shown, it is understood that the control system may include a paper roll size detecting means. Thus follower roll 201 (see FIG. 8) can be mounted on a pivot arm 202 for the purpose of actuating a shaft 203 suitably mounted in a sleeve bearing 204, which shaft 203 actuates warning device 205. The warning device 205 may be a horn, buzzer, or signal light, and tells the operator of the apparatus that the paper roll 138 is reaching a near minimum size.

It has been pointed out above that a rotary switch 52 can be actuated through a drive chain 90 (FIG. 7) for the purpose of signaling a silicone control rectifier (hereafter referred to as SCR) unit 51 for regulating the speed of the motor 45 which drives the paper roll 38. The purpose of the control system is to provide that the motor 45 will be able to drive the paper roll 38 progressively faster as the accumulation of paper in the accumulator decreases. The decrease of paper is visually noted by the raised or lowered position of the movable frame 79. The speed of the motor 45 is therefore controlled by a varying voltage at its control point, such as a potentiometer, which varies the voltage from the power supply. It is preferred that the power supply be one that is built in and therefore would consist of a tachometer generator (not shown) located in or near the infeed conveyor, and it would normally be driven by a chain and sprocket arrangement so as to give the desired ratio of tachometer generator voltage to conveyor speed, such as the sheet feeding conveyor belt 26. A percent of voltage support, therefore, would be connected between the tachometer generator and the rectifier unit 51 and would be under the control of the rotary switch 52 so that the change in the speed of the paper roll 38 would be proportionate to the amount of paper stored in the accumulator and the speed of the sheet feeding conveyor. Thus, the infeeding conveyor running at a given speed causes the tachometer generator to produce a given voltage, and when this given voltage is applied to the unit 51 at its full value it will cause the motor 45 to drive the paper roll 38 at about the rate of speed of the conveyor. However, this latter speed relationship will occur only when the movable member 79 in the accumulator reaches a maximum raised position, and this maximum raised position will be sensed by the switch 52. When the member 79 is close to, or at its lowest position, the paper roll 38 will be driven at a very slow speed, because any sudden call for more paper by the feed roll 103 will merely draw the required amount from the accumulator.

From what has been described above it can now be appreciated that the protective ply of material may be cut by the rotary cutter 106 such that its effective length is equal to the length of the cut sheet S, or longer or shorter. It also has appeared in the above disclosure that the protective sheet material P is brought into engagement with the sheet S in such a manner that it is mated with the under surface of the sheet S and thereafter the two plies S and P move together. As is shown in FIG. 5, the two plies moving together reach a point where they are intended to be projected into the stacker section 18. There is a critical point through which the two plies must pass to assure the accurate retention of the protective ply P at the underside of the sheet material S.

The protective ply P is prevented from electrostatically clinging to the roll 168 by means of the air projected from the jet nozzle 183 which will cause the protective ply to remain with the sheet material in passing over the gap space occupied by the jet nozzle 183. As the two plies begin to move out into space in the stacker section 18, the air currents from the nozzle 174 cause the protective ply to cling tenaciously to the undersurface of the sheet material S. This clinging action can be adjusted to suit the characteristics of the protective ply material by adjusting the lower lip 175 of the nozzle 174. Thereafter the two plies of material are retained in the stacker section 18 on the currents of air from the nozzle 174. Thereafter the air escapes around the sides and ends of the sheet material and the sheet material falls through the escaping column of air onto the stack accumulated therebelow.

The foregoing description has set forth certain preferred embodiments of the present interleafing system for sheet material stacking apparatus, and it is the intent and purpose of the foregoing specification and to include all possible variations and modifications permitted by the state of the prior art.

What is claimed is:

1. In apparatus for handling cut sheets interleafed with protective plies, conveyor means having a receiving end for the cut sheets and a discharge end, a source of protective material in initially endless form, means to feed the protective material upwardly into said conveyor means between the ends thereof and under the cut sheets, cutter means interposed in said feed means for cutting the endless protective material into separate lengths, control means regulating said cutter means in timed sequence to the passage of the leading and trailing ends of each cut sheet to cut lengths of protective material, and means to forceably mate a leading portion of each cut length of protective material with each cut sheet moved by said conveyor means, said mating means acting continuously to force each cut length of material against each cut sheet throughout the length thereof.

2. The apparatus set forth in claim 1 wherein said mating means includes fluid jet means directed toward the leading end of each cut sheet, said jet means effecting a partial wrap of the protective material over the leading end of each cut sheet.

3. In apparatus for handling cut sheets interleafed with protective plies, conveyor means having a receiving end for the cut sheets and a discharge end, stacking means aligned with said discharge end of said conveyor means, a source of protective material in initially endless form, means to feed the protective material into said conveyor means between the ends thereof, cutter means interposed in said feed means for cutting the endless protective material into separate lengths, control means regulating said cutter means in timed sequence to the passage of the leading and trailing ends of each cut sheet to cut lengths of protective material, and means to forceably mate each cut length of protective material with the leading end of each cut sheet moved by said conveyor means, said cut lengths of protective material remaining with the cut sheets discharged by said conveyor means into said aligned stacking means.

4. In sheet handling and stacking apparatus the improvement of conveyor means for moving individual sheets seriatim from a receiving end toward a discharge end thereof, sheet stacking means aligned with said conveyor discharge end, an endless roll of protective material in the apparatus, means to move said protective material concurrently with the movement of sheets on said conveyor means including means to insert said protective material in advance of said sheets reaching said discharge end under the sheets moving on said conveyor means, protective material cutting means interposed in said protective sheet material moving means, control means connected to said cutting means to cut lengths of said protective material, and means to detect the position of the leading and trailing edges of the individual sheets and actuate said material moving means to move the material in timed relation to the detection of the leading edges of the individual sheets and to cut the material in timed relation to the detection of the trailing edges of the individual sheets, said cut lengths of protective material being moved with each sheet by said conveyor means into said sheet stacking means to protectively interleaf therewith.

5. Apparatus for interleafing plies of protective material with cut sheets in a stack of cut sheets comprising a conveyor having a cut sheet receiving end and an opposite discharge end, said conveyor having a first section spaced from a second section between the ends thereof, a source of protective material in the apparatus, means adjacent said first conveyor section to move said protective material toward said space between said conveyor sections, protective material cutting means interposed in said moving means to cut said material into ply lengths longer than said cut sheets passing over said space, mating means at said conveyor space to mate each cut ply length of protective material under each cut sheet moved by said conveyor over said space, cut sheet receiving and stacking means at said discharge end of said conveyor, and means supplying a fluid stream at said conveyor discharge end to float the cut sheet and the protective ply into said stacking means, said last means including a fluid jet directed under said protective ply to maintain the mated relation thereof with the cut sheet.

6. The apparatus set forth in claim 5 wherein said mating means comprises a fluid jet directed to lift the leading end of the ply length of protective material into the path of movement of the cut sheet.

7. The apparatus set forth in claim 5 wherein means is provided between said source of protective material and said material moving means to accumulate length of protective material in a series of loops, said accumulator means including a movable member to release the loops of material to said moving means.

8. In apparatus for interleafing a protective ply of sheet material with precut sheets, first conveyor means having a receiving end for said precut sheets and a discharge end, said apparatus providing a stacking section beyond said discharge end of said conveyor means to receive said sheets with a ply of sheet material interleafed therewith, a source of protective sheet material, second conveyor means transporting said protective sheet material toward said precut sheets at a zone intermediate said receiving and discharge ends of said first conveyor means, cutting means interposed in said second conveyor means to cut said protective sheet material, control means connected to said cutting means, means connected to said cutting means and operated in response to the length of said precut sheets to start and stop said cutting means through said control means, and air supply nozzles disposed adjacent said intermediate zone and adjacent said discharge end of said first conveyor means, said nozzles adjacent said intermedite zone initiating interleafing of said ply of sheet material with said precut sheets and said nozzles adjacent said discharge end maintaining said ply of sheet material interleafed with said precut sheets delivered to said stacking section.

9. The apparatus set forth in claim 8 wherein said second conveyor means is disposed below said first conveyor means to deliver said protective ply of sheet material under said precut sheets.

10. The apparatus set forth in claim 8 wherein said first conveyor means includes precut sheet supporting surfaces and the said air supply nozzles adjacent said intermediate zone inserts said protective ply of sheet material between said precut sheets and said supporting surfaces.

11. The apparatus set forth in claim 8 wherein said air supply nozzles adjacent said intermediate zone of said first conveyor lifts the leading end of said protective ply of sheet material upwardly in front of said precut sheet and maintains an air supply to hold the protective ply of sheet material against said precut sheet during the conveyance of said precut sheet past said intermediate zone.

12. The apparatus set forth in claim 8 wherein said air supply nozzles adjacent said discharge end of said first conveyor means to maintain said protective ply of sheet material against said precut sheet discharged into said stacking section.

References Cited

UNITED STATES PATENTS

| 3,182,539 | 5/1965 | Williams | 83—205 |
| 3,235,433 | 2/1966 | Cvacho et al. | 156—354 X |
| 3,212,229 | 10/1965 | Vreeland et al. | 53—66 X |

FOREIGN PATENTS

| 220,457 | 8/1961 | Austria. | |

WILLIAM S. LAWSON, Primary Examiner

J. F. COAN, Assistant Examiner

U.S. Cl. X.R.

53—157; 83—94, 203, 365